Dec. 30, 1947.  F. P. PARISH  2,433,675
MACHINE FOR MAKING TAMPONS
Filed Dec. 27, 1943   6 Sheets-Sheet 1

INVENTOR
FRANK P. PARISH
BY
ATTORNEY

Dec. 30, 1947.    F. P. PARISH    2,433,675
MACHINE FOR MAKING TAMPONS
Filed Dec. 27, 1943    6 Sheets-Sheet 2
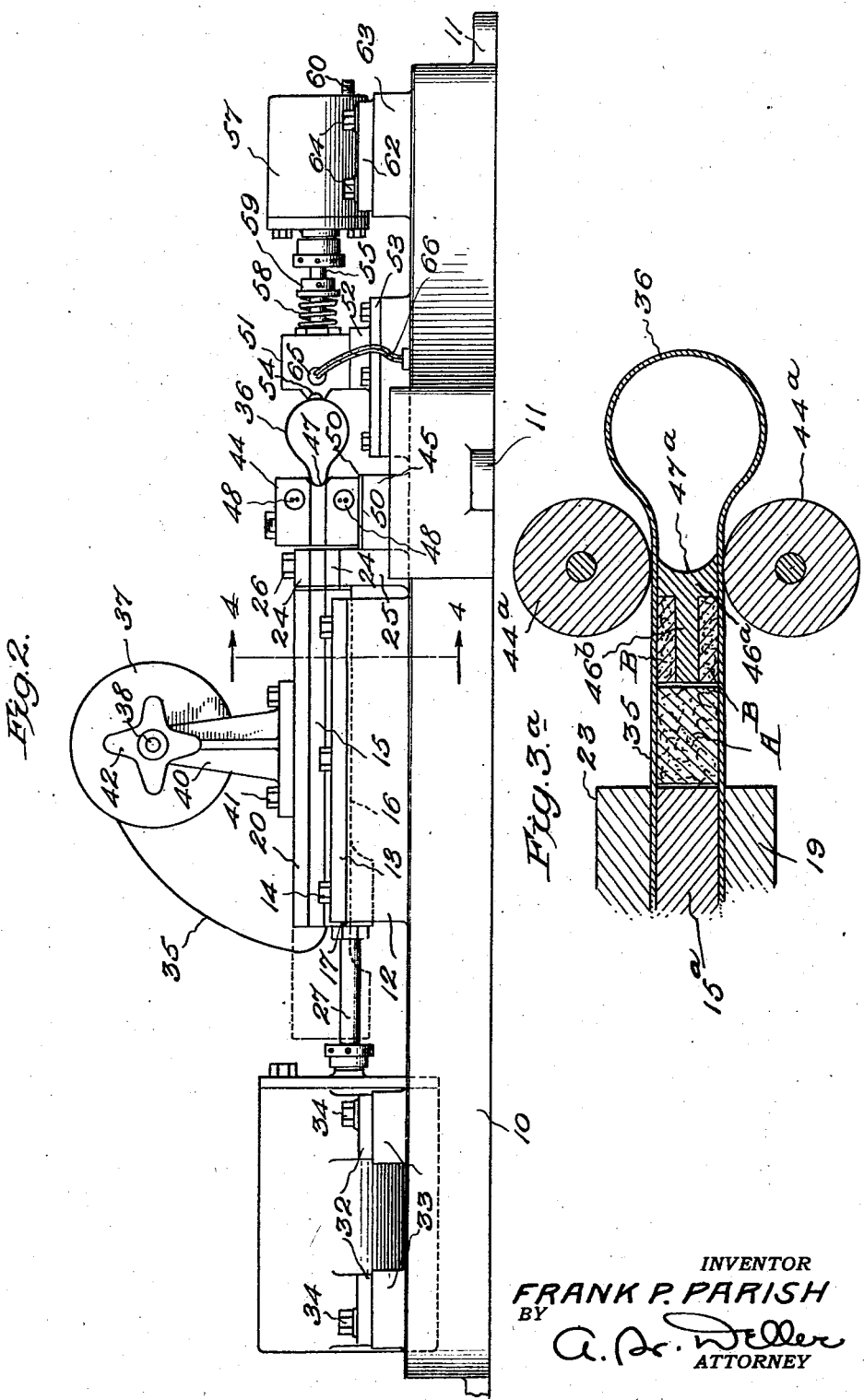
INVENTOR
FRANK P. PARISH
BY
ATTORNEY Dec. 30, 1947.     F. P. PARISH     2,433,675
MACHINE FOR MAKING TAMPONS
Filed Dec. 27, 1943     6 Sheets-Sheet 3
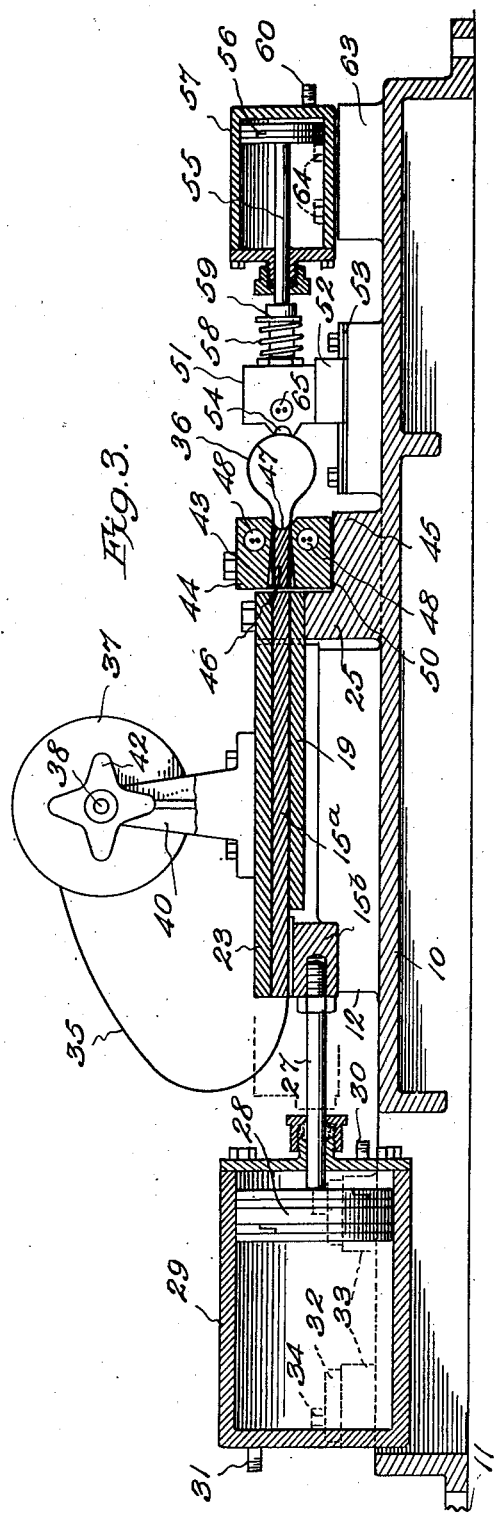
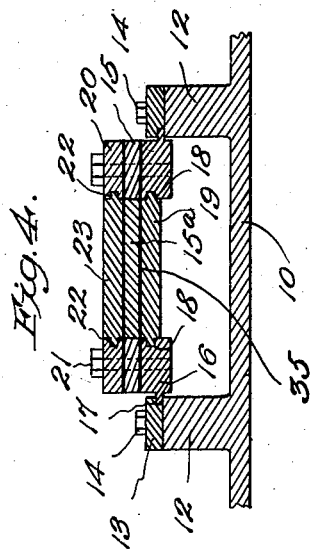
INVENTOR
*FRANK P. PARISH*
BY
*A. P. Deller*
ATTORNEY

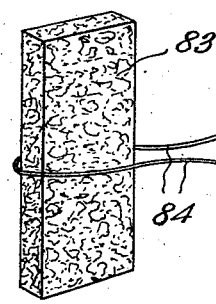
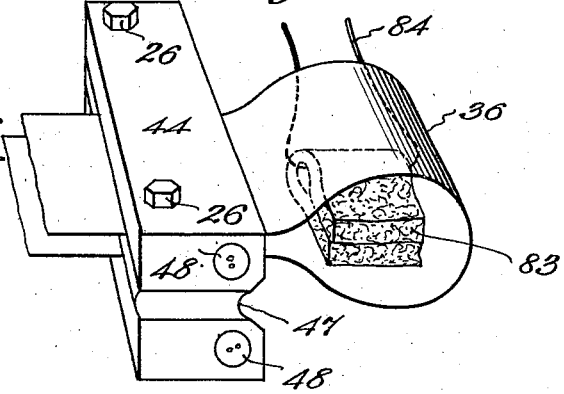
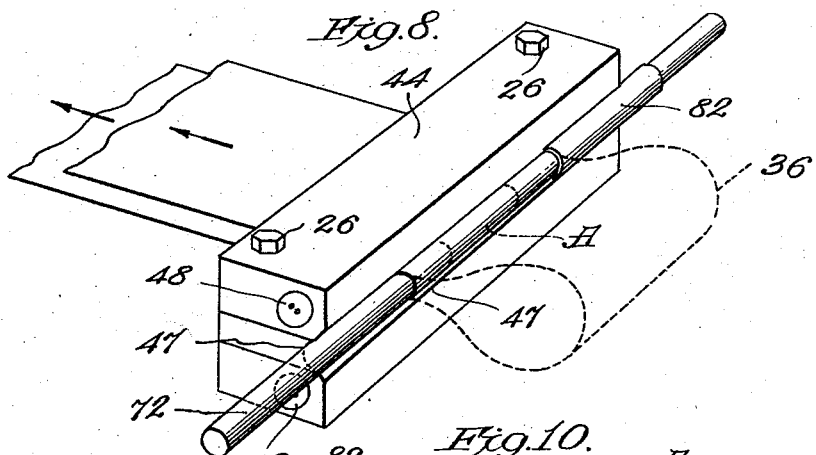
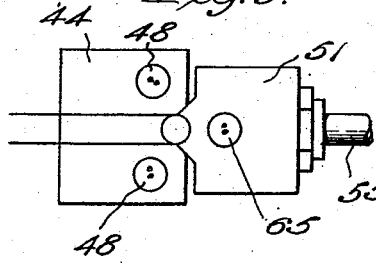
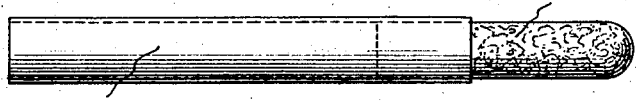

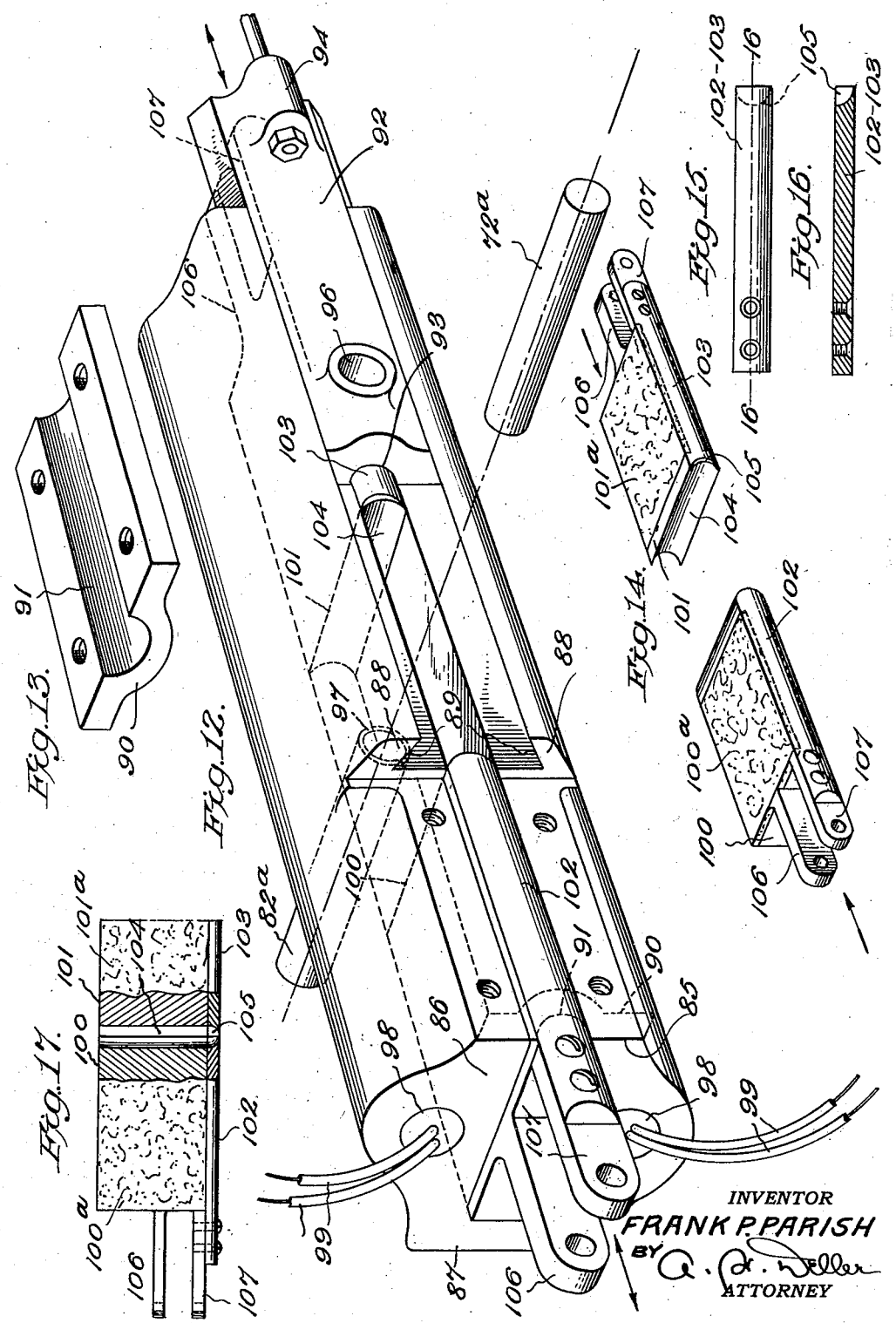

Patented Dec. 30, 1947

2,433,675

UNITED STATES PATENT OFFICE 2,433,675

MACHINE FOR MAKING TAMPONS

Frank P. Parish, Taneytown, Md.

Application December 27, 1943, Serial No. 515,852

19 Claims. (Cl. 18—17)

The invention relates to machines for making tampons and more particularly machines for producing catamenial tampons.

Tampons have been in use for many years for absorbing discharges and secretions from body cavities. Although preferable in many respects to surface applications for this purpose, the use of tampons has been limited by certain disadvantageous features, this being especially with respect to catamenial tampons as presently manufactured. The objections inherent in some existing types of catamenial tampons arise from the fact that the material comprising the tampons has been subjected principally to longiutdinal compression in attempting to give sufficient bulk to said tampons sufficient to absorb a heavy flow of body fluid and at the same time to provide the relatively small diameter necessary to facilitate the insertion of said tampons into the body cavities. Because of the aforesaid longitudinal compression of the tampon material, the tampons when in use, expand longitudinally thereby bringing the lower portions of said tampons into contact with delicate membranes causing discomfort and chafing, and further resulting, in many instances, in causing the tampons by reason of the longitudinal expansion, to extend into the lower portions of the body cavity. This develops further inefficiency in the tampons by reason of the absorption thereby of other foreign matter such as urine, which causes the tampons to lose their efficiency for the purpose intended.

Some other existing types seek to accomplish the desired result by rolling a strip of cotton tight in moderation and then subjecting the rolled mass to compression. In this instance it is obvious that expansion due to absorption is limited substantially by reason of the fact that the rolled mass does not unroll or is not caused to unroll by reason of absorption.

Another existing product uses a cellulose material which is required to be encased in a gauze housing because the cellulose material is of such a character as would otherwise disintegrate and accordingly could not be readily removed in its entirety.

A tampon of the indicated class, in order to provide maximum efficiency and comfort, must be adapted for easy insertion into a body cavity, whether natural or artificial, and must be capable of readily absorbing heavy fluid discharges and must develop no discomfort when in place in the body cavity. For most efficient satisfactory operation and comfort it is essential for the catamenial tampon to remain well within the vagina. This can only be obtained by lateral and radial expansion of a tampon consisting of a relatively large mass of material compressed to the smallest state possible, as previously set forth herein.

In case of longitudinal expansion, the tampon is apt to expand and extend out of the vagina, and come into contact with the urethra and other contiguous structures. As a result the tampon in such case is likely to become saturated with urine, thus destroying its effectiveness for its intended purpose and causing extreme irritation and discomfort to the user.

The difficulties encountered upon applying conventional means of pressure for the purpose of reducing the size of the material, using any material and size, can readily be visualized if you consider other materials, such as steel for example, which can be pressed hot or cold in stages. The material is such that it will retain the shape and size to which it is reduced in the first stage so that it is admissible to the cavity of the smaller die which is to reduce it still further. By similar successive operations the mass can be reduced to any given dimension. However, the inherent resilience of cotton or most other absorbent materials, is such that masses of such materials cannot be successfully reduced in size by successive operations for the reason that the absorbed material will not remain in a semi-compressed state, which is essential under such conditions in order that it may be introduced into a smaller die.

It, therefore, becomes apparent that it is essential to devise a method and means whereby the absorbent material can be reduced in size by a compressing action which is continuous in its operation from the initial expanded state of the material to the final predetermined compressed state thereof.

It has been found by experience that this material compressed to a predetermined degree will, for all practical purposes, remain in its compressed state until subjected to moisture.

If the compressed material is subjected to heat either during the period of compression or afterwards while held in a compressed state and allowed to cool while held in the compressed state, a product can be produced which will retain its shape and size equally satisfactorily, and a finished product by this means can be produced which is somewhat softer than is the case if the process is carried out without heat and cooling.

The most satisfactory product is a material compressed radially or laterally to the smallest diameter possible which does not result in a product of such hardness that its absorbing efficiency is reduced. Such a satisfactory product obviously reduces the difficulties of insertion to a minimum and at the same time will expand by reason of absorption radially and laterally in the most efficient manner.

Because of the wide variation of condition found with respect to the application of this novel product, both as to size of cavity which may be the result of injury, as well as to the variation in flow to be absorbed, it is highly desirable that a most effective and efficient means of compressing material be found in order that a larger mass may be employed just as effectively where extreme conditions exist.

The invention has for a further object the provision of a novel and efficient machine, which is simple in construction and operation, for manufacturing tampons according to the novel method and more particularly catamenial tampons capable of being easily inserted into the female vagina for relatively comfortable retention therein during catamenia, and adapted to expand laterally or radially rather than longitudinally and further of sufficient bulk to represent an absorptive capacity compressed into cylindrical shape by lateral or radial compression, small enough to permit of easy insertion, and preferably rounded at one end, with a smooth outer surface.

The invention contemplates further the provision of a novel machine for producing tampons consisting of large masses of absorbent material, laterally or radially compressed into relatively small volume with smooth outer surfaces and rounded at the forward ends to facilitate insertion into body cavities, and which will retain their shape after manufacture, yet not to be too hard or set too firmly or otherwise treated so as to interfere with their ability to expand and absorb.

Another object of the invention is the provision of a novel machine for producing catamenial tampons consisting of large masses of absorbent materials compressed into a size and shape specially designed for easy insertion of said tampons into the vaginal cavity, and developing no discomfort to the user during the menstrual periods, and not expanding longitudinally in use.

The invention furthermore has for its object to provide a machine in which the tampons are compressed to a relatively small diameter, but not so as to be so dense and hard that the ability of the tampons to expand is materially affected, nor so that their surfaces are glazed, scorched or otherwise treated to affect injuriously their ability to expand and absorb, and yet so as to be capable of retaining their dimensions and shape after removal from the machine in which said tampons have been compressed.

The invention proposes primarily a novel machine for producing tampons of cylindrical form having relatively small diameters and having smooth outer surfaces and capable of absorbing maximum amounts of fluids and without any inherent tendency to expand longitudinally to any appreciable extent to thereby avoid injurious or uncomfortable contact with sensitive membranes or tissues tending to develop discomfort or injury during use of said tampons.

In addition, the invention proposes the provision of a novel machine for economically producing tampons in quantity and of a commercial type in which the objections and disadvantages inherent in existing tampons are overcome and avoided.

Other objects and advantages of the invention will appear from the description hereinafter and the features of novelty will be pointed out in the claims.

In the accompanying drawings, which illustrate an example of the invention without defining its limits, Fig. 1 is a plan view of the novel tampon making machine;

Fig. 2 is a side elevation thereof;

Fig. 3 is a longitudinal section on the line 3—3 of Fig. 1;

Fig. 3a is a diagrammatic fragmentary section on the same line 3—3 illustrating another form of the novel machine;

Fig. 4 is a cross-section on the line 4—4 of Fig. 2 looking in the direction of the arrows;

Fig. 6 is a perspective view of the cotton pad from which the tampons are made;

Figs. 7, 8 and 9 are detail views illustrating successive steps in the formation of the tampons;

Figs. 10 and 11 are detail views of the tampon and its tubular container at the end of an operative cycle of the machine;

Fig. 12 is a fragmentary perspective view illustrating another type of the novel forming mechanism and associated elements;

Fig. 13 is a perspective view of a cover plate embodied in the forming mechanism shown in Fig. 12;

Fig. 14 is a perspective diagrammatic view illustrating the forming slides included in the mechanism shown in Fig. 12;

Fig. 15 is a side view of one of the secondary or end forming slides which constitute parts of the mechanism illustrated in Fig. 12;

Fig. 16 is a longitudinal section on the line 16—16 of Fig. 15, and

Fig. 17 is a plan view partly in section, of the forming and secondary slides in position to compress the material into the form of a tampon and to shape an end thereof.

In the form shown in Figs. 1 to 9 inclusive, the machine comprises a suitably designed and dimensioned base 10 provided with supporting lugs 11 which may be apertured for the accommodation of screws or bolts whereby the machine is fixed in place. The base 10 serves as a support for the mechanism whereby the material such as cotton is compressed into the form of a generally cylindrical tampon of relatively small diameter with smooth outer surface and densely packed to provide for maximum absorption of body fluids. The aforesaid mechanism is preferably such that it will develop only lateral or radial compression in the formation of the tampons and will not subject the tampons to any material longitudinal pressure in the production thereof, so that the tampons during production thereof will not be compressed materially beyond the original longitudinal dimensions of the blanks from which the tampons are made, and therefore the finished tampons will include no inherent tendency to expand longitudinally to any appreciable extent during use and in any case will not expand longitudinally beyond the initial longitudinal dimension of said blank. The latter is predetermined by the use for which the finished tampons are designed and is always such that said tampons will develop no injurious or uncomfortable contact with sensitive tissues or membranes during periods of use.

Figure 1:
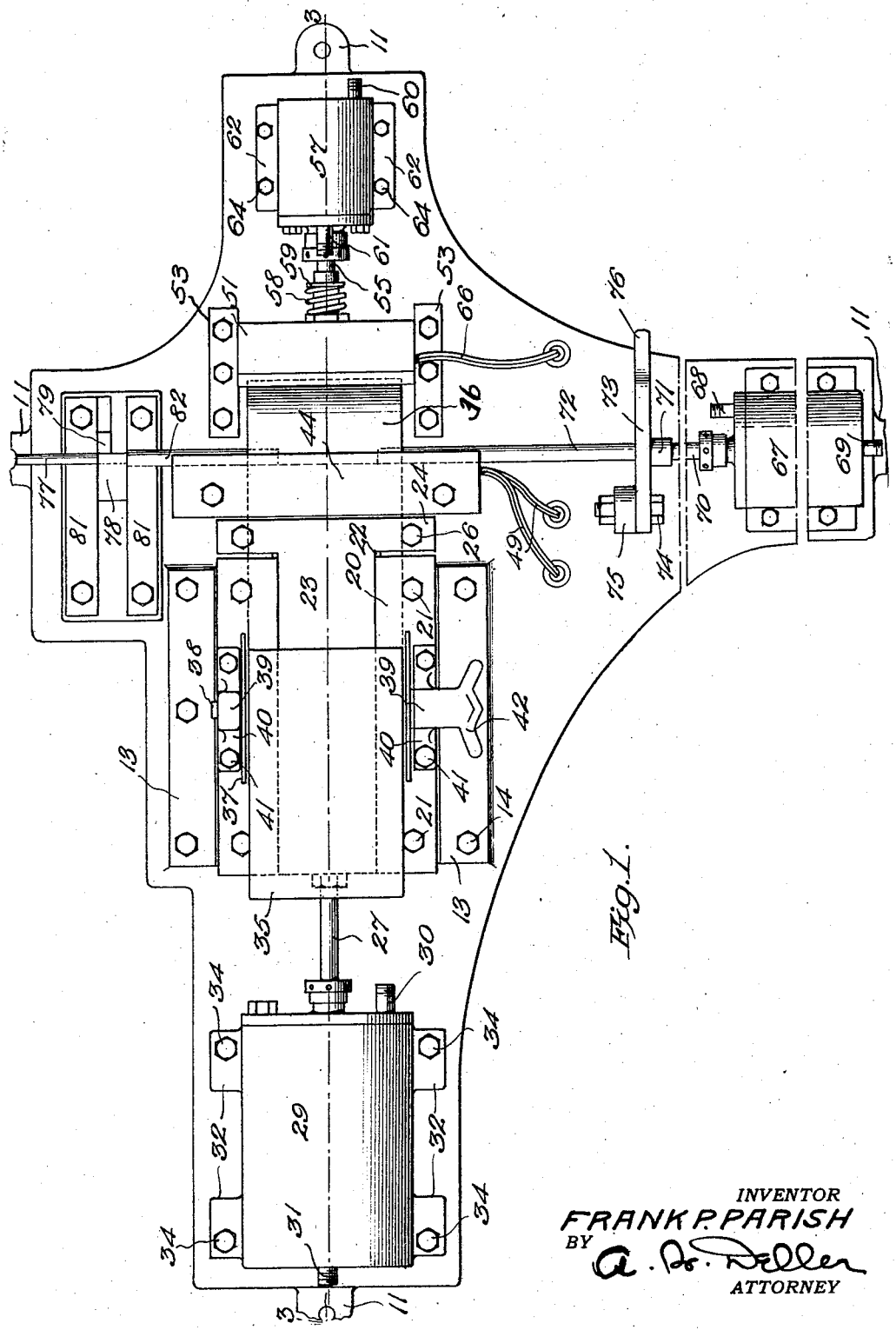

As shown in the drawings, the mechanism for forming the tampon includes upright ribs 12 projecting upwardly from the base 10 in spaced parallel relation to each other and carrying grooved outer guide members 13 in corresponding spaced parallel relation as illustrated in Fig. 4. The guide members 13 preferably are removably mounted on the ribs 12, for instance, by means of cap screws 14 or the like as shown in Figs. 1 and 4. The machine further includes spaced parallel members 15 mounted in slidable engagement with the opposite longitudinal edge surfaces of an inner guide member 15—a which is stationary for the purpose to be more fully set forth hereinafter. The members 15 are located in surface engagement with and carried by lower slide members 16 having ribs 17 along their outer edges slidably fitted in the grooves of the outer guide members 13, as illustrated in Fig. 4. The inner longitudinal side surfaces of the slide members 16 may be formed with grooves extending lengthwise thereof for slidably accommodating longitudinal ribs 18 provided along the opposite longitudinal side surfaces of a second stationary inner guide member 19 located below and in surface parallelism with the inner guide member 15—a as shown in Fig. 4. Upper slide members 20 may be located on the upper surface of the members 15 and have their inner longitudinal side surfaces formed with grooves extending lengthwise thereof. The slide members 16 and 20 may be fastened in place on the members 15 in any suitable manner as by means of cap screws 21. The grooves of the slide members 20 are arranged to slidably accommodate longitudinal ribs 22 provided along the opposite longitudinal side surfaces of a third stationary inner guide member 23 located above and in surface parallelism with the inner guide member 15—a as illustrated in Fig. 4. The inner guide members 15—a, 19 and 23 may be fixed in place in the machine in any convenient manner, as by being provided with lateral extensions 24 mounted upon upright bosses 25 forming part of or secured to the base 10, and fastened in place on said bosses 25 by cap screws 26. Suitable provision is made to space the extensions 24 of the respective inner guide members 15—a, 19 and 23 apart to maintain said guide members in place in the machine. With the arrangement shown and described the members 15 are slidably movable relatively to the stationary inner guide members 15—a, 19 and 23 and are guided in such movements by the slide members 16 and 20 in co-operation with the ribs 18 and 22 of the members 19 and 23, and by the ribs 17 of the slide members 16 in association with the grooves of the outer guide members 13.

In the operation of the machine the members 15 are reciprocated by suitable means in synchronism with associated elements for the purpose to be more fully set forth hereinafter. For instance, as shown in the drawings the members 15 may form part of a unit which includes a boss 15—b arranged to be connected by means of a rod 27 with a piston or plunger 28 reciprocable in a cylinder 29. At opposite ends the latter is provided with inlets connected by means of pipes 30 and 31, respectively, with a source of operating fluid under pressure whereby the piston or plunger 28 is actuated as will appear more fully hereinafter. The operating fluid may be of any suitable type and may comprise steam, compressed air or other gas, or suitable liquids such as water, oil, etc. Suitable provision is made in any convenient way to either manually or automatically control the admission of the pressure fluid to the cylinder 29 in a manner to effect the desired operation of the piston or plunger 28. The cylinder 29 is conveniently fixed on the base 10 and in the illustrated example is provided with lugs 32 resting upon seats 33 projecting upwardly from the base 10. To permit ready removal of the cylinder 29, the lugs 32 are fastened to the seats 33 by means of screws or the like 34. Instead of the fluid operated means for reciprocating the members 15 and associated elements, any suitable mechanical or other means such as cams and the like, may be utilized to thereby automatically develop the operative steps.

The mechanism under discussion further includes a forming and compression band 35 preferably of flexible metal, such as steel, and of a width dependent upon the longitudinal dimensions of the tampons to be produced, and by the use of which the absorbent material is compressed in a continuous operation to its final predetermined size. The band 35 has its free end portion located between the upper face of the inner guide member 15—a and the contiguous face of the inner guide member 23 and extends beyond the same and in a return direction between the lower face of the inner guide member 15—a and the adjacent face of the inner guide member 19. The band 35 projects laterally beyond the side edges of the inner guide members and is connected with the members 15 by having its opposite edge portions clamped between the slide members 16 and 20, respectively, and the opposite faces of the members 15 by means of the cap screws 21. With this arrangement the band 35 forms a flexible loop 36 beyond the one end of the members 15, as illustrated in Figs. 2 and 3, for the purpose to be more fully described hereinafter. To enable the dimensions of the loop 36 to be varied in accordance with the type of tampons to be produced and to provide a reserve for replacing parts of said band which may become damaged from use, the band 35 continues from the lower faces of the members 15 beyond the opposite end thereof to a reel 37 on which the reserve portion of said band 35 is wound. The reel 37 is carried by trunnions 38 rotatably mounted in bearings 39 forming part of or secured to upright brackets or standards 40 projecting upwardly from the slide members 20 of the carrier or slide 15 and fastened in place thereon by cap screws 41 or their equivalent. Suitable means is preferably provided for fixing the reel 37 against unintentional rotation. For instance, one of the trunnions 38 may be screw-threaded for the accommodation of a wing-unit 42 which may be screwed into engagement with the contiguous bearing 39 to fix the reel 37 against rotation, and unscrewed at will to permit rotative movement thereof.

To control the operation of the loop 36 in the production of the tampons, the band 35 passes through the opening 43 of an upright forming block 44 supported and fixed upon a seat 45 forming part of and projecting upwardly from the base 10. A forming wedge or core 46 is located in the block opening 43 between the two webs of the band 35 as shown in Fig. 3, for reasons to be more fully set forth hereinafter. The opening 43 of the block 44 preferably flares outwardly in a rearward direction toward the left in Fig. 3 to provide a space between the wedge or core 46 and the contiguous surface of the opening 43 for the purpose of reducing friction on the band 35 in the operation of the machine. The outer end surface of the core 46 and the contiguous portions of the forming block 44 at the opening 43 thereof are shaped to provide a concave recess 41, as shown in Figs. 2 and 3. Provision is made for heating the forming block 44 in any suitable manner for the purpose of applying heat to the tampon during the formation thereof as will appear more fully further on in the description. In the illustrated example the forming block 44 is provided with apertures 48 for the accommodation of electrically operated heating devices of conventional type connected with a source of electricity by means of wires 49 for heating said forming block 44. In the preferred arrangement an insulating medium such as a sheet of asbestos 50 or the like, is located between the forming block 44 and the seat 45 to avoid undesirable dissipation of heat.

For co-operation with the forming block 44 and loop 36 in the production of the tampons, the machine further includes a heat conducting block 51 carried by a slide 52 slidably mounted in horizontal guideways 53 suitably located on the base 10. The heat conducting block 51 is provided with a concave recess 54 conforming to the radius of the loop 36 when in compressing position and located in opposed registry with the recess 47 of the block 44 as shown in Figs. 2 and 3, it being understood that the loop 36 of the band 35 is located between the recesses 47 and 54.

In the operation of the machine, the heat conducting block 51 is reciprocated in the guideways 53 by suitable mechanism which may operate automatically or under manual control to develop the desired operative steps in operative synchronism with the actuation of the loop 36 of the band 35 and associated elements. The means whereby the aforesaid reciprocation of the heat conducting block 51 is effected may be of any suitable type. For instance, as shown in the drawings, the heat conducting block 51 may be connected by means of a rod 55 with a plunger or piston 56 reciprocable in a cylinder 57; in the preferred form of such arrangement the connection between the block 51 and the rod 55 is made yielding as by locating a coil spring 58 between the block 51 and a collar 59 fixed on the rod 55. At opposite ends the cylinder 57 is provided with inlets connected by means of pipes 60 and 61 respectively with a source of operating fluid under pressure whereby the plunger or piston 56 is operated as will be more fully explained hereinafter. As previously mentioned herein the operating fluid may be of any suitable type either gaseous or liquid. In this instance suitable provision is also made in any convenient way to control the admission of the operating fluid to the cylinder 57 in a manner to effect the desired actuation of the plunger or piston 56 and its associated elements in proper operative synchronism with the other parts of the machine. The cylinder 57 is fixed in place in any convenient manner and in the illustrated example is provided with lugs 62 resting upon seats 63 projecting upwardly from the base 10. To enable the cylinder 57 to be removed at will for any purpose, the lugs 62 are fastened to the seats 63 by means of cap screws 64 on their equivalent. In this instance also the fluid operated means for actuating the plunger or piston 56 and its related elements may be replaced by mechanical means such as cams and the like.

In the preferred arrangement the heat conducting block 51 is also heated in any convenient manner as, for instance, by means of a conventional electric heating device located in an aperture 65 with which the block 51 is provided, said heating device being connected with a source of electricity by means of wires 66. To prevent undesirable dissipation of heat the heat conducting block 51 may be also insulated from the slide 52 in any conventional manner.

In addition to the parts so far described, the machine includes means operating in properly timed relation to the other mechanism for ejecting the finished tampons. This ejecting means in the form illustrated in the drawings consists of a cylinder 67 suitably mounted on the base 10 and having its opposite ends connected respectively by means of pipes 68 and 69 with a source of operating fluid under pressure, said operating fluid being either gaseous or liquid as hereinbefore set forth. A conventional piston is slidably mounted in the cylinder 67 and is connected with a piston rod 70 which in turn is coupled by means of a coupling 71 to an end forming and discharge plunger 72 which is slidable in the concave recess 47 of the forming block 44. With the described arrangement the major common axis of the cylinder 67 and piston rod 70 is in axial registry with the concave recess 47 of the forming block 44 and the end forming and discharge plunger 72 is of to diameter to slidably fit said recess 47. Convenient provision is made for controlling the operation of the ejecting rod or discharge plunger 72 and the controlling piston in the cylinder 67 in proper synchronism with the other mechanisms included in the machine.

Instead of operating the discharge plunger 72 by means of the fluid actuated means illustrated in the drawings, said plunger 72 may be operated by suitable cams or other mechanism.

Figure 5:
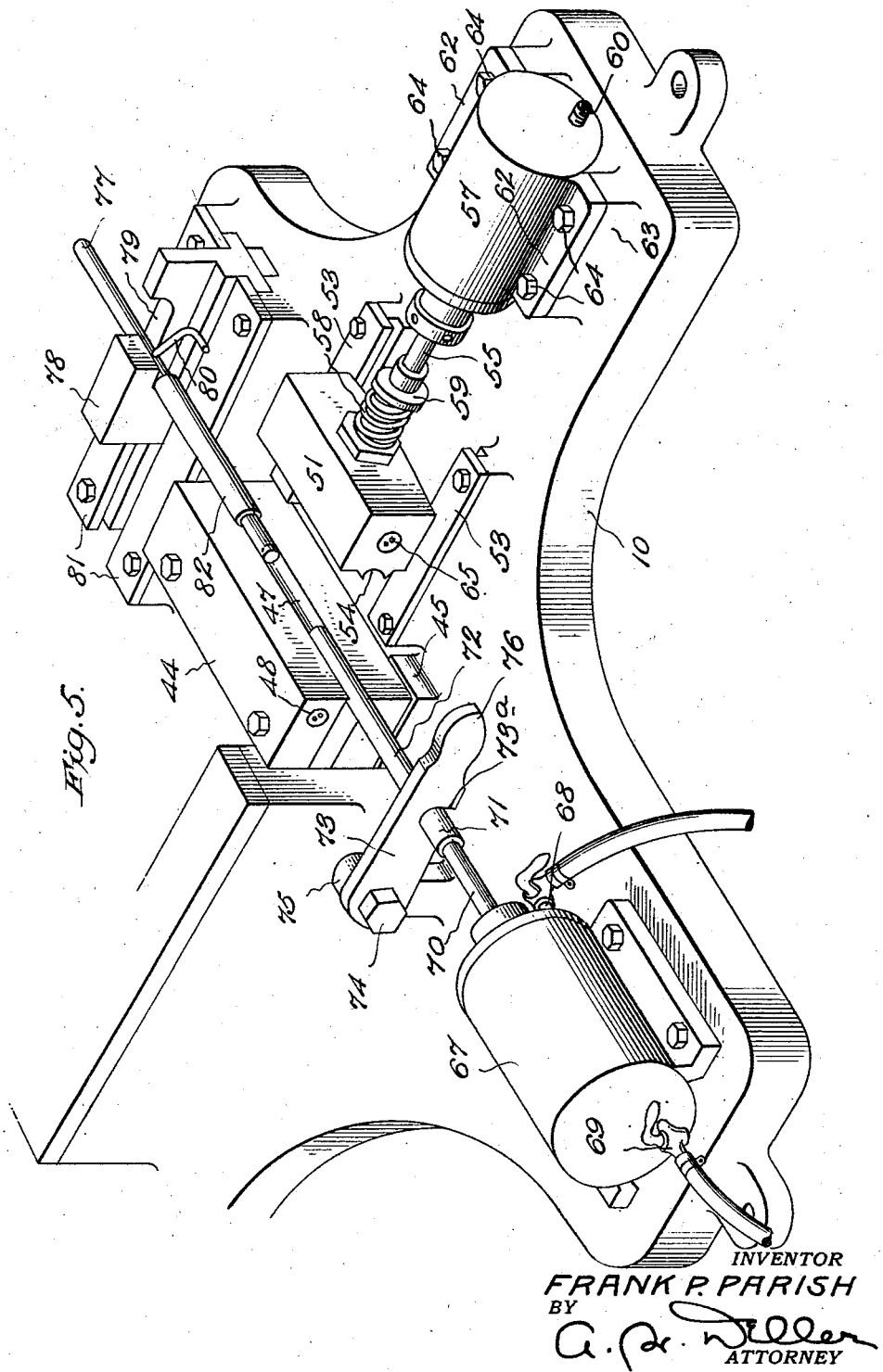
Fig. 5 is a fragmentary perspective view of the machine.

In addition to its other functions the discharge plunger 72 may be used to form a rounded end on the tampons and may have its free end recessed for this purpose, and in addition may serve to determine the length of the tampons being produced by the machine. For this latter purpose provision is accordingly made for arresting said plunger 72 in an initial position in the recess 47 and for permitting subsequent additional movement in said recess 47 for reasons which will appear more fully hereinafter. In the illustrated example the means whereby the aforesaid results are accomplished comprise a stop lever 73 pivotally mounted at 74 on a lug 75 projecting upwardly from the base 10. The stop lever 73 at its free end preferably terminates in the form of a handle 76 for facilitating the pivotal manipulation of said stop lever 73 and at an intermediate point includes a recess 73—a dimensioned and shaped to fit over the discharge plunger or ejecting rod 72 as shown in Figs. 1 and 5. In the operative position illustrated in Figs. 1 and 5 the stop lever 73 is in the path of the coupling 71 at a point between the latter and the forming block 44, so that said coupling 71 in co-operation with the stop lever 73 arrests the movement of the discharge plunger 72 lengthwise of the recess 47 and thereby predetermines the initial position of said plunger 72 therein. To permit subsequent further movement of the plunger 72 lengthwise of the recess 47 for the purpose of ejecting the tampon as will be more fully explained hereinafter, the stop lever 73 is pivotally swung to shift it out of the path of the coupling 71. Obviously the stop lever 73 may be replaced by other means suitable for the purpose intended.

For co-operation with the discharge plunger 72 in predetermining the length of the finished tampons, the machine is provided with a pin 77 co-operating with the discharge plunger 72 to determine the length of the tampons and to act as a support for the flexible band 35 whereby the latter is caused to bend on a radius corresponding to the diameters of the two pins 72 and 77 when the loop 36 is adjusted to its compressing position, to thereby control the diameter of the finished tampons. In addition, a stop member 78 having a recess 79 for the slidable accommodation of the pin 77 and a movable latch 80 for maintaining said pin 77 therein is provided, it being understood that this latch 80 may be replaced by other equivalent means. The stop member 78 is movable to and from its operative position for instance by being slidably mounted in horizontal guideways 81 located on the base 10. In the operation of the machine the pin 77 passes through a sleeve 82 of suitable material and having an inner diameter corresponding to the outer diameter of the tampon. One end of the sleeve 82 is supported in the forming block 44 in axial registry with the concave recess 47 thereof, and the other end of said sleeve 82 is in engagement with the stop member 78, as shown in Figs. 1 and 5. In its operative position the sleeve 82 is heated by contact with the heated block 44.

The material, such as cotton, from which the tampons are made may be in any suitable form prior to its being acted on by the machine. Preferably however, the cotton or other material initially is in the form of a rectangular pad of predetermined dimensions dependent upon the size of tampons to be produced. For instance, the pad 83 illustrated in Fig. 6 may be four inches in length and one and one-half inches in width and of a thickness to provide the desired amount of material for the tampon. To facilitate the removal of the tampons from the body cavities, the tampons may be provided with cords 84 which project exteriorly of the body cavities during use of the tampons. The cords 84 being readily accessible enable the tampons to be easily removed from the body cavities at will. The cords 84 may be combined with the tampons in any convenient manner, as by being looped over the pad 83 before the latter is acted on by the machine.

At the beginning of an operative period the parts of the machine are in the position illustrated in Figs. 1, 2, and 3, in which the loop 36 of the band 35 is in its extended position. As the first step in the production of a tampon, the pad 83 of cotton or other suitable material which is to constitute the tampon is folded upon itself symmetrically on its transverse centre line with the cord 84 located in the bend and in such folded condition is inserted or placed within the loop 36, for instance, as illustrated in Fig. 7. The aforesaid folding of the pad 83 and the introduction of the folded pad into the loop 36 may be done either by hand or mechanically. In proper operative timing the pin 77 will be moved by its operating mechanism and shifted lengthwise of the recess 47 to a temporarily stationary initial position therein. Prior to the aforesaid operation of the pin 77, a sleeve 82 has been inserted into position in the forming block 44 and in contact with the stop member 78. The pin 77 will accordingly pass through the sleeve 82 before it enters the recess 47 and will come to rest in the latter with the end of said pin 77 at a predetermined point in said recess 47 to provide a support for one end of the tampon in the production thereof. The distance between the opposed ends of the plunger 72 in its arrested position and pin 77 is dependent upon the length of the tampons to be produced, such length being approximately equal to that of the folded pad 83 or its equivalent, when initially placed in the machine, and defines a concave recess in which, in co-operation with associated elements the tampons are molded or formed. For instance, the molding recess may be one half inch in diameter and two inches in length, it being understood however that these dimensions are not to be construed as defining limitations in sizes; variations may be made by suitably changing the diameter of the recess and by setting the stops to arrest the discharge plunger 72 and pin 77 at different distances apart.

In proper operative timing with the aforesaid operative steps the mechanism for slidably operating the unit which includes the members 15 toward the left in Figs. 1, 2 and 3, is then started. In the illustrated example this is accomplished by admitting operating fluid to the cylinder 29 through the pipe 30. This causes the piston 28 to travel to the left in the cylinder 29 in Fig. 3 and correspondingly moves the members 15 lengthwise of the outer guide members 13 and the inner guide members 19, 15—a and 23 in the same direction. The band 35 which is attached to the members 15 participates in this movement of the latter as does also the reel 37 and its brackets or standards 40. As the members 15 are operated in the manner set forth, the band 35 will accordingly be drawn through the opening 43 of the forming block 44 and over the wedge or core 46 thereof in a manner to gradually and progressively reduce the size of the loop 36. The pad 83 of cotton or other charge of material previously placed within said loop 36 will thereby be progressively compressed radially and forced into the concave molding recess defined by that part of the recess 47 of the forming block 44 in which the pad 83 or its equivalent is located. The loop 36 of the band 35 in its final position at this stage is curved about the pin 77 and cooperates with the concave recess 47 to provide a cylindrical recess in which the folded pad 83 of cotton or other material is molded to corresponding cylindrical form. As the cotton or other material is thus compressed radially into cylindrical form it will be heated by the hot forming block 44. At the proper moment, pressure fluid is admitted through the inlet 69 into the cylinder 67 whereby the piston therein will be moved upwardly in Fig. 1 to correspondingly move the piston rod 70 and to shift the coupling 71 into engagement with the stop lever 73 which is in operative position at the time. The same result may be obtained by starting the operation of any other mechanism which may replace the cylinder 67 and its associated elements. In any event the discharge plunger 72 partakes of the movement of the piston rod 70 and moves lengthwise of the concave recess 47 of the heating block 44 until the coupling 71 engages the stop lever 73. At this point further movement of the parts is arrested and admission of pressure fluid to the cylinder 67 is cut off or the operation of the equivalent operating mechanism is stopped. In this way the end forming and discharge plunger 72 will be adjusted lengthwise of the recess 47 to an initial temporarily stationary position therein to cause its recessed end to engage the compressed cotton or other material and to give to the one end thereof a rounded form as will be apparent. With this arrangement, the cotton or other material is held in a compressed state by the loop 36 of the band 35 and the surface friction is such as to cause the plunger 72 to form rounded ends of controlled hardness and efficiency on said tampons.

In predetermined operative timing as, for instance, after the adjustment of the loop 36 to its final molding position shown by solid lines in Fig. 8, operating fluid will be admitted through the pipe 68 to the right hand end of the cylinder 57. This will cause the piston 56 to be shifted to the left in said cylinder 57 and will correspondingly move the slide 52 and with it the heat conducting block 51 in the guideways 53. This operation will finally force the block 51 against the band 35 with the reduced loop 36 thereof located in the concave recess 54 of said block 51, as shown in Fig. 9. The compressed tampon is thereby further heated by conduction to complete the forming thereof. The parts are permitted to remain in this position for a few seconds or other predetermined time period of sufficient length to enable the heat to act on the cotton or other material in the compressed form and to produce a cylindrical tampon of relatively small diameter with a smooth outer surface. The heating of the blocks 44 and 51 is controlled in any suitable manner so the maximum temperature to which the cotton or other material is subjected during the compression and molding of the tampons A is sufficient to mold the fibers in the intended cylindrical form but not to scorch or otherwise injure the tampon A, or to interfere with its ability to absorb body fluids when in use.

After a tampon A has been formed and heated as described, the pin 77 will be operatively shifted from the operative position shown in Fig. 8 and withdrawn from the tubular sleeve 82. In proper timing with this withdrawal of the pin 77, the locking lever 73 is pivotally adjusted to its inoperative position out of the path of the coupling 71 and operating fluid is again admitted to the cylinder 67 through the pipe 69.

This causes the piston to rise in the cylinder 67 in Fig. 1 and with it the piston rod 70 and thereby moves the end forming and discharge plunger 72 into and lengthwise of the sleeve 82. As the plunger 72 is thus operated, the previously formed tampon A will be forced into the heated sleeve 82 without injury to or deformation of the rounded end of the tampon, to thereby enclose said tampon A and protect it against contamination as shown in Fig. 10. At the same time, the insertion of the tampon A into the sleeve 82 in which said tampon A closely fits, smooths the outer surface thereof. Any fins or other irregularities which may have formed on the outer surface of the tampon A during molding or formation thereof by the machine, are caused to disappear by coming into contact with the hot wall of the sleeve 82. As a result, the outer surface of said tampon A is smooth and entirely free from any irregularities or obstructions which might interfere with the insertion of the tampon A into place in a body cavity or render such insertion difficult or painful. When the tampon A has been inserted into the sleeve 82, the discharge plunger 72 is withdrawn therefrom and the sleeve 82 with the tampon A therein is removed from the machine. The sleeve 82 and contained tampon A are then permitted to cool which causes the stressed fibers to become set to fix the tampon A in its cylindrical form. The setting of the material by cooling the same while the tampon is contained within the sleeve 82 produces a tampon which will retain its shape after manufacture without requiring the material to be compressed to a condition of hardness which will interfere with the ability of the tampon to expand or cause its surface to be glazed, scorched, or otherwise adversely affected.

It is not essential that the heat be applied to the sleeve 82 or equivalent forming box as above described. The compressing operation may be performed cold, the tampon forced into the sleeve 82 cold, and the heat applied to the sleeve 82 in a subsequent operation while the sleeve 82 is being conveyed through heated ovens and cold areas prior to dipping and wrapping.

Likewise, one end can be rounded and the length controlled after the tampon has been forced into the sleeve 82 and at the time when the sleeve is being conveyed through the heating ovens. In this instance the sleeves might be held in a belt affair with a round pin at each end of the sleeve, the end face of one pin being formed in a manner suitable to shape the end of the tampon. These pins may be forced into the sleeve 82 to any desired distance and held there during the heating operation as well as the cooling operation, thereby relieving the compressing machine of the time element involved by this operation and allowing that part of the machine to operate at a higher rate of production.

At any appropriate time after the cooling period, the tampon A may be partly ejected from the sleeve 82 so as to project beyond an end thereof, for instance, as illustrated in Fig. 11. In this condition the sleeve 82 constitutes a means for conveniently handling the tampon A while dipping, drying and wrapping without physical contact with human hands. The tampons A are thereby protected against contamination and are maintained in an aseptic condition.

The sleeve 82 is particularly useful in handling the tampon A during the application, for instance, to the rounded end thereof of a suitable coating either by dipping the end of the tampon into a supply of such coating or by spraying or otherwise applying said coating thereto. The coating preferably comprises a bland substance having a low surface tension which does not affect the absorption qualities of the cotton or other material, which remains in a smooth, dry state under normal, or even tropical or arctic weather conditions indefinitely, which becomes slippery when moistened, which dissolves quickly in moisture, and which because of its low surface tension will, when dissolved, increase rather than decrease the absorptive power of the cotton or other material with which it comes in contact. Examples of satisfactory water-dispersible, film-forming substances for the coating composition are mentioned in the application of Arthur B. Donovan, Serial No. 368,989 filed in the United States Office on December 7, 1940, now Patent No. 2,340,311.

In continuing the operative cycle of the machine, subsequent to the removal of the tampon containing sleeve 82 therefrom, the discharge plunger 72 is withdrawn from the loop 36 by introducing additional operating fluid through the pipe 68 to the upper end of the cylinder 67. This causes the piston in the latter to move downwardly in said cylinder 67 in Fig. 1, and to coincidentally shift the piston rod 70 and with it the discharge plunger 72 in the same direction back to initial inoperative position.

In proper timing, operating fluid is introduced through the pipe 61 into the left hand end of the cylinder 57 whereby the piston 56 therein is moved to the right in Fig. 3, and the heating block 51 with its slide 52 is correspondingly shifted in the guideways 53 to restore said heating block 51 to the initial position shown in Figs. 2 and 3.

In addition and in predetermined operative sequence operating fluid is introduced through the pipe 31 into the left hand end of the cylinder 29 to shift the piston 28 therein to the right back to the initial position illustrated in Fig. 3. This movement of said piston 28 will correspondingly shift the members 15 between the outer guide members 13 and relatively to the inner guide members 19, 15—a, and 23. As a result of these operations, the band 35 will be shifted through the opening 43 of the heating block 44 and out the core or wedge 46 thereof to the right to thereby expand the loop 36 to the enlarged form shown in Figs. 2 and 3, ready to receive the next folded pad 83 or other charge of cotton or other material. After a new sleeve 82 has been inserted in the machine, the cycle of operation hereinbefore described is repeated.

It is to be noted that the flexible band 35 in the operation of the machine, moves between the opposite surfaces of the inner guide member 15—a and the respective adjacent surfaces of the inner guide members 19 and 23. The flexible band 35 is thereby held against buckling particularly when moved from the closed position of the loop 36 to the open position thereof.

As shown in Fig. 3a, the forming block 44 may be replaced by forming rollers 44—a for the purpose of reducing friction, said rollers 44—a being suitably mounted on the base 10 in operative association with a conveniently supported core 46—a corresponding to the core 46 and having a concave recess 47—a corresponding to the recess 47 of the core 46.

These rollers 44—A may be magnetized sufficiently for the purpose of further reducing friction when the flexible belt 35 is made of steel. The use of magnetized-forming rollers 44—A in this instance would hold the flexible belt 35 against the rollers 44—A, leaving a slight clearance between the flexible belt material and the core 46—a of the forming block. The resulting elimination of friction in such an arrangement would be advantageous and add to the efficiency of the mechanism.

In the preferred construction the core 46—a is formed with a relatively reduced section 46—b on the opposite surfaces of which pads B of felt or other soft material are secured in any conventional manner.

In the form now being described the inner guide members 15—a, 19 and 23 and the elements associated therewith are located at a distance from the section 46—b and pads B of the core 46—a to provide a space in which a suitable pad or cushion A of felt or other soft material is mounted in any convenient manner.

The arrangement is such that the inside surface of the band 35 will pass in wiping engagement with the opposite faces of the pad A and the exposed faces of the pads B, as said band 35 is slidably operated in the performance of its operative functions. In this way the band 35 is automatically maintained in a condition of maximum operative efficiency and cleanliness.

In some cases it may be sufficient for maintaining the band 35 in an efficient operative condition to provide either the pad A or the pads B alone and to omit one or the other. In other arrangements, as for instance in the form of machine first described, the band 35 may be made of stainless steel or other non-oxidizing material in which case both the pad A and the pads B may be omitted.

In any case the band 35 is reciprocated between the rollers 44—a and core 46—a to manipulate the loop 36 relatively to the concave recess 47—a in the same way as described with respect to the first form of the machine. In all other respects the machine embodying the features illustrated in Fig. 3a may be constructed and operate in the same way as the machine first described.

Another form of hot forming block and associated elements is illustrated in Figs. 12 to 17, inclusive, whereby the cotton or other material is laterally compressed into the form of tampons without any material longitudinal compression as in the machine first described herein.

This alternative form of the forming mechanism comprises a forming block of suitable material consisting of a horizontal bottom member 85 and a corresponding top member 86 located in spaced surface parallelism with each other and connected by means of an upright side member 87 extending longitudinally and preferably throughout the length of said members 85 and 86. In the preferred form the horizontal members 85 and 86 are cast in one piece with the upright member 87 to constitute a unit, it being understood that this is not to be construed as limiting the manner in which said unit may be constructed.

The longitudinal free edges of the bottom member 85 and top member 86 are provided with projecting ribs 88 which extend from one end of said members 85 and 86 to an intermediate point thereof and have their opposed faces bevelled to provide guideways 89, as shown in Fig. 12. A cover plate 90 in its operative position extends from the ends of the ribs 88 to the opposite ends of the members 85 and 86, and is secured to the free edges thereof preferably so as to be removable at will as by means of conventional cap screws or the like, as illustrated by dotted lines in Fig. 12. On its inner face the cover plate 90 is provided with a concave guide groove 91 extending lengthwise thereof and located in registry with the space between the horizontal members 85 and 86, as shown in Fig. 12. A closure slide 92 having its opposite longitudinal edges bevelled and slidably fitted in the guideways 89 is movable from the inoperative position illustrated in Fig. 12, to an operative position in engagement with the cover plate 90 for purposes to be more fully set forth hereinafter. The closure slide 92 is formed on its inner face with a concave guide groove 93 extending lengthwise of said slide 92 in registry with the space between the horizontal members 85 and 86. Any suitable mechanism may be provided for slidably operating the closure slide 92 or, if desired, the latter may be manually shifted in the guideways 89. For instance, as shown, the closure slide 92 may be provided with an apertured lug 94 for the reception of one end of an operating rod 95. The latter in turn may be operatively connected with the operating mechanism as by being attached to a piston slidable in a cylinder suitably connected with a source of operating fluid as in the first form of the machine shown herein. Obviously the rod 95 may be operatively connected with suitable types of mechanism other than the foregoing fluid actuated means. At an appropriate point the closure slide 92 is provided with an opening 96 which extends transversely therethrough to facilitate the discharge of the tampons from the forming block, as will be more fully set forth hereinafter. For co-operation with this opening 96 in the aforesaid discharge of the tampons, the upright member 87 also includes an opening 97 which extends transversely therethrough. During the discharge period, the openings 96 and 97 are in registry with each other.

Suitable provision is made in any conventional manner for maintaining the forming block in a suitably heated condition during an operative period of the machine. For instance, as shown in Fig. 12, the horizontal members 85 and 86 may be provided with recesses 98 for the accommodation of electrically operating heating units of conventional type. The said heating units are connected with a source of electricity by means of wires 99, any customary devices such as switches being provided for controlling the electric current whereby the aforesaid heating units are energized.

The mechanism under discussion further includes co-operating forming slides 100 and 101 slidably mounted between the horizontal members 85 and 86 in opposed relation and in registry with each other.

The one longitudinal side surface of each slide 100 and 101 is in surface engagement with the inner face of the upright side member 87 and is slidably guided thereby. The opposite longitudinal side surface of the slides 100 and 101 are in surface engagement respectively with the flat inner surfaces of secondary slides 102 and 103. The latter are of half-round form in cross-section and slidably fit into the concave guide groove 91 of the cover plate 90, and the concave guide groove 93 of the closure slide 92 respectively. The inner transverse end surfaces of the slides 100 and 101 are shaped to form complemental concave recesses 104 as shown in Figs. 12 and 14. The concave recesses 104 of the two slides 100 and 101 are in opposed relation to each other and provide a cylindrical compression chamber in which the cotton or other material is compressed laterally or radially into the form of a cylindrical tampon in the manner to be more fully set forth hereinafter. The free inner ends of the secondary slides 102 and 103 are formed with concave recesses 105 as shown in Figs. 15 and 16. The recesses 105 co-operate with each other and with the concave recesses 104 to provide a rounded end recess for the aforesaid cylindrical compression chamber in which rounded recess the one end of the cylindrical tampon is given a rounded form to facilitate the insertion of the tampon into a body cavity.

The slides 100 and 101 and the secondary slides 102 and 103 may be operated in properly timed relation by any suitable form of mechanism or manually, if desired. For instance, the slide-actuating mechanism may be of the fluid-operated type hereinbefore described in connection with the first form of the machine. As shown in Figs. 12 and 14, the slides 100 and 101 may be provided with integral apertured lugs 106 for suitable connection with the operating mechanism. Similar lugs 107 having corresponding functions are connected with and project beyond the one end of the secondary slides 102 and 103 and provide stops upon the inner surfaces of the latter as illustrated in Figs. 12 and 14. The parts are so arranged and dimensioned that the inner recessed ends of the secondary slides 102 and 103 will be flush with the inner recessed end faces of the slides 100 and 101 when said lugs 107 are in contact with the outer end faces of said slides 100 and 101, as shown in Figs. 12 and 14.

The mechanism being described further includes a discharge plunger 72—a similar to the discharge plunger 72 of the form of the machine first described and operated in a corresponding manner for the same expelling purpose. The advance end of the plunger 72—A is formed with a concave recess so as not to deform the rounded end of the molded tampon during discharge thereof. In some instances the recessed end of the plunger 72—a may be utilized to form the rounded end of the tampon in lieu of the previously described method of producing said rounded end. In addition, a tubular sleeve 82—a is fitted into the opening 97 of the side member 87 with its inner end flush with the inner surface thereof, and corresponds to the previously described sleeve 82 and likewise accommodates a rod corresponding to the rod 77 of the first form and receives the molded tampon as it is ejected by the discharge plunger 72—a. The stop member 78 and associated elements of the machine first described herein or equivalent means may be operatively combined with the forming block of Fig. 12 in substantially the same way as shown in Fig. 1.

With the cover plate 90 in place and the forming block of Fig. 12 otherwise fully assembled, the parts may occupy the initial position shown in Fig. 12 at the beginning of an operative period. At this stage the compression space defined by the horizontal members 85 and 86 and the opposed inner ends of the slides 100, 101, 102 and 103 is exteriorly accessible between the opposed ends of the cover plate 90 and the retracted closure slide 92.

This enables the cotton or other material preferably in the form of a folded pad with cord such as the pad 83 and cord 84, to be inserted into the aforesaid compression space between the horizontal members 85 and 86 and the opposed ends of the slides 100, 101, 102 and 103. After the insertion of the pad 83 and cord 84 has been effected, the closure slide 92 is shifted in the guides 89 to the left in Fig. 12 into contact with the one end of the cover plate 90. At the proper time a pin corresponding to the pin 77 of Fig. 1 is inserted into the sleeve 82—a until the end of said pin is flush with the inner end of the sleeve 82—a which itself is flush with the inner surface of the side member 87. At this stage the space in which the pad 83 of cotton or other material is located is closed, excepting for access through the opening 96 of the closure slide 92. As the operation proceeds, this access through the opening 96 will also be cut off so that the aforesaid space is completely closed during the formation of the tampons therein.

In proper timing the slides 100 and 101 and the secondary slides 102 and 103 are concurrently shifted toward each other, or are otherwise relatively or independently operated, to finally bring said slides into contact with each other to form a cylindrical compression chamber one end of which is closed by the end of the sleeve 82—a in the side member 87 and the end of the pin in said sleeve and the other by the co-operating concave recesses 105 of the secondary slides 102 and 103 as shown in Fig. 17. As the slides approach each other, the opening 96 of the closure slide 92 will be covered on the inside by the secondary slide 102 and the folded pad 83 of cotton or other material will be subjected to a progressive lateral or radial pressure and finally will be fully compressed in said compression chamber into cylindrical form with one end flat and the other end rounded by the co-operating concave recesses 105 of said secondary slides 102 and 103.

As the cotton or other material is thus compressed radially into cylindrical form, it will be heated by the hot members 85 and 86 and the hot slides which have become heated by conduction, to thereby mold the fibers of the cotton in the cylindrical form of a tampon similar to the previously described tampon A.

The parts are permitted to remain in the molding position for a few seconds or other predetermined time period of sufficient length to enable the heat developed by the heated members 85 and 86 and the heated slides to act on the cotton or other material in the compressed form and to produce a cylindrical tampon of relatively small diameter with a smooth outer surface.

The heating of the members 85 and 86 is controlled in any convenient manner, so that the maximum temperature to which the cotton or other material is subjected during the compression and molding of the tampon is sufficient to mold the fibres in the intended cylindrical form but not to scorch or otherwise injure said tampon or interfere with its ability to absorb body fluids when in use.

At the end of the heating period, the secondary slides 102 and 103 are withdrawn or shifted away from each other relatively to the slides 100 and 101, and the closure slide 92 is adjusted to the right in Fig. 12 to bring the opening 96 thereof into axial registry with the discharge plunger 72—a and the molded tampon which at this state is still in the cylindrical space defined by the concave recesses 104 of the slides 100 and 101.

The discharge plunger 72—a will then be operated by its mechanism or otherwise to shift said plunger 72—a through the opening 96 and into engagement with the rounded end of the molded tampon in compression chamber between the concave ends of the slides 100 and 101. Because of the concave recessed end of the discharge plunger 72—a, the latter will fit said rounded end of the tampon without deforming the same. If desired, the plunger 72—a may be rotated in any convenient manner to cause its concave recessed end to develop an ironing effect on the rounded end of the tampon to smooth out the surface of said end and thereby cause any flashes or ridges present thereon to disappear. As the operation of the discharge plunger 72—a is continued, the molded and compressed tampon will be forced from the compression chamber between the slides 100 and 101 into the sleeve 82—a in the same way as in the form of the machine first described. The results of this operation and its effect on the tampon are the same as previously described. When the tampon has been transferred to the sleeve 82—a, the discharge plunger 72—a is withdrawn and returned to normal position and the sleeve 82—a with tampon contained therein is removed from the machine and permitted to cool. This causes the stressed fibers to become set to fix the tampon in its cylindrical form. The slides 100 and 101 and associated elements are then appropriately restored to normal positions whereupon the machine is ready for another operative cycle.

It will be understood that the heat may be applied to the tampon after it is compressed and pushed into the sleeve instead of applying the heat directly through the machine while the tampon is being compressed. As a matter of fact, experiments indicate that the production machinery, in its preferred form, will compress the cotton or other material while cold, push it into the sleeve and heat the sleeve and then cool the tampon before it is pushed out of the sleeve. Doing it this way will make it possible for the machine to operate at a much higher rate of production.

In the operation of the machine in all of its forms the tampons are produced by subjecting the material only to lateral or radial pressure and without the development therein of any material longitudinal compression, for instance, beyond the original length of the folded pad of cotton or its equivalent when placed in the machine. As a result, the finished tampons have no inherent tendency to expand longitudinally when removed from the machine and accordingly may be accurately produced in desired and uniform lengths best adapted to the purpose for which the particular tampons are designed.

The tampons, when finished, are of the smallest diameters consistent with maximum efficiency, and of such compactness as will not interfere with the absorption ability thereof. The finished tampons are further provided with at least one rounded end to facilitate insertion into body cavities.

In all forms of the machine suitable provision may be made for preventing the string 84 of the pad 83 from interfering with the production of the tampons. For instance, the pin 77 of Fig. 1 and the corresponding pin in Fig. 12 may be provided with a hole extending lengthwise of said pins in which the cord 84 rests during the compression and end-forming operations.

Many of the elements of the machine are capable of being made of various types and classes of materials including suitable plastic materials. The latter is particularly true in connection with the inner guide members 15—a and associated elements, the cores 46 and 46—a, the forming slides 100 and 101, the secondary slides 102 and 103, and the tubular sleeves 82 and 82—a, as well as other parts of the mechanism.

The cover plate 90 and groove 91 and the entire housing in which the slides 100 and 101 operate may be made of plastic or non-oxidizable material or those parts may be lined with layers of plastic in such a way as to cover the working surfaces with plastic or some other nonoxidizable material. As shown in Fig. 14, the opposite faces of the slides 100 and 101 may carry layers 100—a and 101—a, respectively, of felt or similar material secured in place in any suitable manner and preferably countersunk to provide yielding-bearing surfaces for engagement with the associate surfaces of the housing.

The novel machine in all of its forms is efficient in operation and requires no particularly skilled supervision and serves to produce tampons of uniform type which are easily inserted into body cavities and are retained therein without physical discomfort. The tampons produced by the machine are inherently absorbent to an efficient degree and are removable and replaceable without difficulty.

Although the present invention has been described in conjunction with a preferred embodiment, it will be understood that modifications and variations may be resorted to without departing from the spirit and scope of the invention, as those skilled in the art will readily understand. Thus, it will be observed that instead of placing the pads of cotton or other material in the machine by hand, this may be done automatically by suitable feeding means. It will be further observed that instead of the fluid actuated means for operating parts of the machine, other types of operating mechanism may be used for this purpose. In addition, instead of arranging and operating the band 35 as illustrated and described, to control the loop 36, the same results may be obtained by fixing one run of the band 35 and exerting an operating force on the other run thereof. Such modifications and variations are all considered to be within the purview and scope of the appended claims.

I claim:

1. In a machine for making tampons, the combination of a pair of co-operating pressure devices at least one of which is heated and at least one of which is movable relatively to the other to form therewith a compression space in which a charge of material is concurrently heated and laterally compressed to predetermined cross-sectional form without any material longitudinal compression, to constitute a tampon substantially free from any inherent tendency to expand longitudinally, means for removably supporting a tubular container in axial registry and communication with said compression space to receive a tampon therefrom, and means whereby the opposite ends of the tampon are shaped during the lateral compression of said material in said compression space, said last named means including a member for transferring the tampon from said compression space into said tubular container.

2. In a machine for making tampons, the combination of a base, an upright forming block mounted on said base and provided with an opening extending transversely therethrough, a core in said opening provided at one end with a concave recess in substantial registry with an upright face of said forming block, a slide slidably mounted on said base for reciprocation in registry with the opening of said forming block a flexible band extending through said opening in opposite directions above and below the core therein to form a loop exteriorly of said forming block in registry with said concave recess for receiving a charge of material, said band being secured to said slide upon opposite surfaces thereof, and means for operating said slide to draw the band through the opening of said forming block to progressively reduce the size of said loop whereby said band laterally compresses said charge of material and in co-operation with said concave recess molds said material into a cylindrical tampon substantially free from inherent tendency to expand lengthwise.

3. In a machine for making tampons, the combination of a base, an upright forming block mounted on said base and provided with an opening extending transversely therethrough, a core in said opening provided at one end with a concave recess in substantial registry with an upright face of said forming block, a slide slidably mounted on said base for reciprocation in registry with the opening of said forming block, a flexible band extending through said opening in opposite directions above and below the core therein to form a loop exteriorly of said forming block in registry with said concave recess for receiving a charge of material, said band being secured to said slide upon opposite surfaces thereof, means for operating said slide to draw the band through the opening of said forming block to progressively reduce the size of said loop whereby said band laterally compresses said charge of material and in co-operation with said concave recess molds said material into a cylindrical tampon substantially free from inherent tendency to expand lengthwise, and means for heating said forming block whereby the molding of said tampon is effected in the presence of heat to thereby fix the tampon in its cylindrical form without interference with its ability to absorb body fluids.

4. In a machine for making tampons, the combination of a base, an upright forming block mounted on said base and provided with an opening extending transversely therethrough, a core in said opening provided at one end with a concave recess in substantial registry with an upright face of said forming block, a slide slidably mounted on said base for reciprocation in registry with the opening of said forming block, a flexible band extending through said opening in opposite directions above and below the core therein to form a loop exteriorly of said forming block in registry with said concave recess for receiving a charge of material, said band being secured to said slide upon opposite surfaces thereof, means for operating said slide to draw the band through the opening of said forming block to progressively reduce the size of said loop whereby said band laterally compresses said charge of material and in co-operation with said concave recess molds said material into a cylindrical tampon substantially free from inherent tendency to expand lengthwise, a second forming block slidably mounted on said base and provided with a concave recess complemental to the recess of said first mentioned forming block, means for slidably shifting said second forming block to adjust its concave recess into surface engagement with the reduced loop, and means for heating said second forming block whereby the molding of said tampon is effected in the presence of heat to thereby fix the tampon in its cylindrical form without interference with its ability to absorb body fluids.

5. In a machine for making tampons, the combination of a base, an upright forming block mounted on said base and provided with an opening extending transversely therethrough, a core in said opening provided at one end with a concave recess in substantial registry with an upright face of said forming block, a slide slidably mounted on said base for reciprocation in registry with the opening of said forming block, a flexible band extending through said opening in opposite directions above and below the core therein to form a loop exteriorly of said forming block in registry with said concave recess for receiving a charge of material, said band being secured to said slide upon opposite surfaces thereof, means for operating said slide to draw the band through the opening of said forming block to progressively reduce the size of said loop whereby said band laterally compresses said charge of material and in co-operation with said concave recess molds said material into a cylindrical tampon substantially free from inherent tendency to expand lengthwise, means for heating said forming block, a second forming block slidably mounted on said base and provided with a concave recess complemental to the recess of said first mentioned forming block, means for slidably shifting said second forming block to adjust its concave recess into surface engagement with the reduced loop, and means for heating said second forming block whereby the molding of said tampon is effected in the presence of heat from said two forming blocks to thereby fix the tampon in its cylindrical form without interference with its ability to absorb body fluids.

6. In a machine for making tampons, the combination of a forming block comprising horizontal top and bottom members in spaced surface parallelism, an upright member connecting said top and bottom members along corresponding edges thereof to form a unit with said horizontal members, said upright member being provided with an opening extending transversely therethrough in registry with the space between said horizontal members for the reception of one end of a tubular sleeve, guide ribs projecting from said horizontal members and extending from an end to an intermediate point thereof, a cover plate removably connected with said horizontal members and extending from the opposite ends thereof substantially into engagement with said guide ribs, said cover plate being provided on its inner face with a concave groove extending lengthwise thereof in registry with the space between said horizontal members, a closure slide slidably mounted in said guide ribs and provided on its inner face with a concave guide groove extending lengthwise thereof in registry with said space between the horizontal members, said closure slide further having an opening extending transversely therethrough in registry with said space and adjustable into axial registry with the opening of the upright member and the tubular sleeve therein, forming slides slidably movable toward each other between said horizontal members and provided with complemental concave recesses at their inner transverse end surfaces, secondary slides having recessed opposed ends and slidably mounted in the concave guide grooves of said cover plate and closure slide respectively and in slidable engagement with said forming slides, said forming and secondary slides in association with said horizontal members initially defining a compression space for the reception of a charge of material, means for slidably operating said closure slide to close said compression space subsequently to the insertion of said charge of material into the same, means for simultaneously shifting said forming and secondary slides toward each other to laterally compress said charge of material into cylindrical form and to coincidentally shape an end thereof to constitute a tampon substantially free from inherent tendency to expand lengthwise, said secondary slides being movable independently of said forming slides in a return direction, and said closure slide being movable in a return direction to adjust its transverse opening into axial registry with the compressed tampon and with the tubular sleeve in the opening of said slide member, and a discharge plunger movable through the opening of said closure slide and fitting the shaped end of said tampon for forcing the latter into said sleeve.

7. In a machine for making tampons, the combination of a forming block comprising horizontal top and bottom members in spaced surface parallelism, an upright member connecting said top and bottom members along corresponding edges thereof to form a unit with said horizontal members, said upright member being provided with an opening extending transversely therethrough in registry with the space between said horizontal members for the reception of one end of a tubular sleeve, guide ribs projecting from said horizontal members and extending from an end to an intermediate point thereof, a cover plate removably connected with said horizontal members and extending from the opposite ends thereof substantially into engagement with said guide ribs, said cover plate being provided on its inner face with a concave groove extending lengthwise thereof in registry with the space between said horizontal members, a closure slide slidably mounted in said guide ribs and provided on its inner face with a concave guide groove extending lengthwise thereof in registry with said space between the horizontal members, said closure slide further having an opening extending transversely therethrough in registry with said space and adjustable into axial registry with the opening of the upright member and the tubular sleeve therein, forming slides slidably movable toward each other between said horizontal members and provided with complemental concave recesses at their inner transverse end surfaces, secondary slides having recessed opposed ends and slidably mounted in the concave guide grooves of said cover plate and closure slide respectively and in slidable engagement with said forming slides, said forming and secondary slides in association with said horizontal members initially defining a compression space for the reception of a charge of material, means for slidably operating said closure slide to close said compression space subsequently to the insertion of said charge of material into the same, means for simultaneously shifting said forming and secondary slides toward each other to laterally compress said charge of material into cylindrical form and to coincidentally shape an end thereof to constitute a tampon substantially free from inherent tendency to expand lengthwise, means for heating said forming block whereby the compression of said tampon is effected in the presence of heat to thereby fix the tampon in its cylindrical form without interference with its ability to absorb body fluids, and means operating through the transverse opening of said closure slide for shifting the tampon into said tubular sleeve.

8. In a machine for making tampons, the combination of a forming core, forming rolls located upon opposite sides of said core in associate relation therewith, a flexible band passing between said rolls and forming core in opposite directions to constitute a forming loop exteriorly thereof in registry with said forming core for receiving a charge of material, and means for operating said band to progressively reduce the size of said forming loop whereby the band laterally compresses said charge of material and in co-operation with said forming core molds said material into a tampon of predetermined cross-sectional shape.

9. In a machine for making tampons, the combination of a forming core, magnetized forming rolls located upon opposite sides of said core in associated relation therewith, a flexible metallic band passing between said rolls and forming core in opposite directions to constitute a forming loop exteriorly thereof in registry with said forming core for receiving a charge of material, and means for operating said band to progressively reduce the size of said forming loop whereby the band laterally compresses said charge of material and in co-operation with said forming core molds said material into a tampon of predetermined cross-sectional shape, said band being magnetically held in contact with said forming rolls to relieve frictional engagement between said forming core and band during operation of the latter.

10. In a machine for making tampons, the combination of a forming core, forming rolls located upon opposite sides of said core in associate relation therewith, a flexible band passing between said rolls and forming core in opposite directions to constitute a forming loop exteriorly thereof in registry with said forming core for receiving a charge of material, means for operating said band to progressively reduce the size of said forming loop whereby the band laterally compresses said charge of material and in cooperation with said forming core molds said material into a tampon of predetermined cross-sectional shape, and means for wiping the opposed surfaces of said band during operation thereof to maintain said surfaces in an efficient operative condition.

11. In a machine for making tampons, the combination of a forming core, forming rolls located upon opposite sides of said core in associate relation therewith, a flexible band passing between said rolls and forming core in opposite directions to constitute a forming loop exteriorly thereof in registry with said forming core for receiving a charge of material, means for operating said band to progressively reduce the size of said forming loop whereby the band laterally compresses said charge of material and in co-operation with said forming core molds said material into a tampon of predetermined cross-sectional shape and wiping pads carried by said forming core for wiping the opposed surfaces of said band during operation thereof.

12. In a machine for making tampons, the combination of a forming core, forming rolls located upon opposite sides of said core in associate relation therewith, a flexible band passing between said rolls and forming core in opposite directions to constitute a forming loop exteriorly thereof in registry with said forming core for receiving a charge of material, means for operating said band to progressively reduce the size of said forming loop whereby the band laterally compresses said charge of material and in co-operation with said forming core molds said material into a tampon of predetermined cross-sectional shape, and a wiping pad located in contiguous relation to said forming core for wiping the opposed surfaces of said band during operation thereof.

13. In a machine for making tampons, the combination of a forming core, forming rolls located upon opposite sides of said core in associate relation therewith, a flexible band passing between said rolls and forming core in opposite directions to constitute a forming loop exteriorly thereof in registry with said forming core for receiving a charge of material, means for operating said band to progressively reduce the size of said forming loop whereby the band laterally compresses said charge of material and in co-operation with said forming core molds said material into a tampon of predetermined cross-sectional shape, a wiping pad located in contiguous relation to said forming core, and additional wiping pads carried by said forming core, said pads wiping the opposed surfaces of said band during operation thereof.

14. In a machine for making tampons, the combination of forming means having a forming recess exteriorly accessible, a flexible band extending through and on opposite sides of the recess and forming a loop exteriorly of said forming means in registry with the forming recess thereof for receiving a charge of material, and means for operating said band to progressively reduce the size of said loop whereby said band laterally compresses said charge of material and in cooperation with said forming recess molds said material into a tampon of predetermined cross-sectional shape and substantially free from inherent tendency to expand lengthwise.

15. In a machine for making tampons, the combination of forming means having a forming recess exteriorly accessible, end forming members extending into said forming recess from opposite directions and spaced apart therein, said end forming members cooperating with said forming recess to define a molding recess, a flexible band extending through and on opposite sides of the recess and forming a loop exteriorly of said forming means in registry with said molding recess for receiving a charge of material, and means for operating said band to progressively reduce the size of said loop whereby said band laterally compresses said charge of material and in cooperation with said molding recess molds said material into a tampon of predetermined cross-sectional shape, said end forming members coincidentally shaping the ends of said tampon without developing any material inherent tendency therein to expand lengthwise.

16. In a machine for making tampons, the combination of forming means having a forming recess exteriorly accessible, end forming members extending into said forming recess from opposite directions and spaced apart therein, said end forming members cooperating with said forming recess to define a molding recess, a flexible band extending through and on opposite sides of the recess and forming a loop exteriorly of said forming means in registry with said molding recess for receiving a charge of material, and means for operating said band to progressively reduce the size of said loop whereby said band laterally compresses said charge of material and in cooperation with said molding recess molds said material into a tampon of predetermined cross-sectional shape, said end forming member coincidentally shaping the ends of said tampon without developing any material inherent tendency therein to expand lengthwise and one of said end members being operated subsequently to the molding of the tampon to discharge the latter from the molding recess.

17. In a machine for making tampons, the combination of forming means having a forming recess exteriorly accessible, a flexible band extending through and on opposite sides of the recess and forming a loop exteriorly of said forming means in registry with the forming recess thereof for receiving a charge of material, means for operating said band to progressively reduce the size of said loop whereby said band laterally compresses said charge of material and in cooperation with said forming recess molds said material into a tampon of predetermined cross-sectional shape and substantially free from inherent tendency to expand lengthwise, and means for heating said forming means whereby the molding of the tampon is effected in the presence of heat to thereby fix the tampon in its molded form without interference with its ability to absorb body fluids.

18. In a machine for making tampons, the combination of forming means having a forming recess exteriorly accessible, a flexible band extending through and on opposite sides of the recess and forming a loop exteriorly of said forming means in registry with the forming recess thereof for receiving a charge of material, means for operating said band to progressively reduce the size of said loop whereby said band laterally compresses said charge of material and in cooperation with said forming recess molds said material into a tampon of predetermined cross-sectional shape and substantially free from inherent tendency to expand lengthwise, and heated means engaging the reduced loop of the band to heat the same whereby the molding of the tampon is effected in the presence of heat to thereby fix the tampon in its molded form without interference with its ability to absorb body fluids.

19. In a machine for making tampons, the combination of forming means having a forming recess exteriorly accessible, a flexible band extending through and on opposite sides of the recess and forming a loop exteriorly of said forming means in registry with the forming recess thereof for receiving a charge of material, means for operating said band to progressively reduce the size of said loop whereby said band laterally compresses said charge of material and in cooperation with said forming recess molds said material into a tampon of predetermined cross-sectional shape and substantially free from inherent tendency to expand lengthwise, means for heating said forming means, and heated means engaging and fitting the reduced loop of the band to heat the same whereby the molding of the tampon is effected in the presence of heat to thereby fix the tampon in its molded form without interference with its ability to absorb body fluids.

FRANK P. PARISH.

REFERENCES CITED

The following references are of record in the file of this patent:

UNITED STATES PATENTS

| Number | Name | Date |
| --- | --- | --- |
| 1,973,117 | Sklar | Sept. 11, 1934 |
| 2,076,389 | Voss | Apr. 6, 1937 |
| 2,263,909 | Webb | Nov. 25, 1941 |
| 354,604 | Long | Dec. 21, 1886 |
| 379,068 | Heller et al. | Mar. 6, 1888 |
| 492,361 | Moulton | Feb. 21, 1893 |
| 2,235,465 | Stamm | Mar. 18, 1941 |
| 2,330,257 | Bailey | Sept. 28, 1943 |
| 2,024,218 | Haas | Dec. 17, 1935 |
| 2,188,923 | Robinson | Feb. 6, 1940 |
| Re. 11,604 | Graves | June 1, 1897 |
| 2,134,930 | Reynolds | Nov. 1, 1938 |
| 2,178,704 | Robinson | Nov. 7, 1939 |

FOREIGN PATENTS

| Number | Country | Date |
| --- | --- | --- |
| 3,748 | Great Britain | Mar. 2, 1891 |